Dec. 31, 1968    M. S. DIETZ    3,418,905
PHOTORESPONSIVE FILM SUPPLY MONITORING APPARATUS
FOR A PHOTOGRAPHIC CAMERA
Filed Dec. 30, 1965    Sheet 1 of 2

INVENTOR.
Milton S. Dietz
BY
Brown and Mikulka

ATTORNEYS

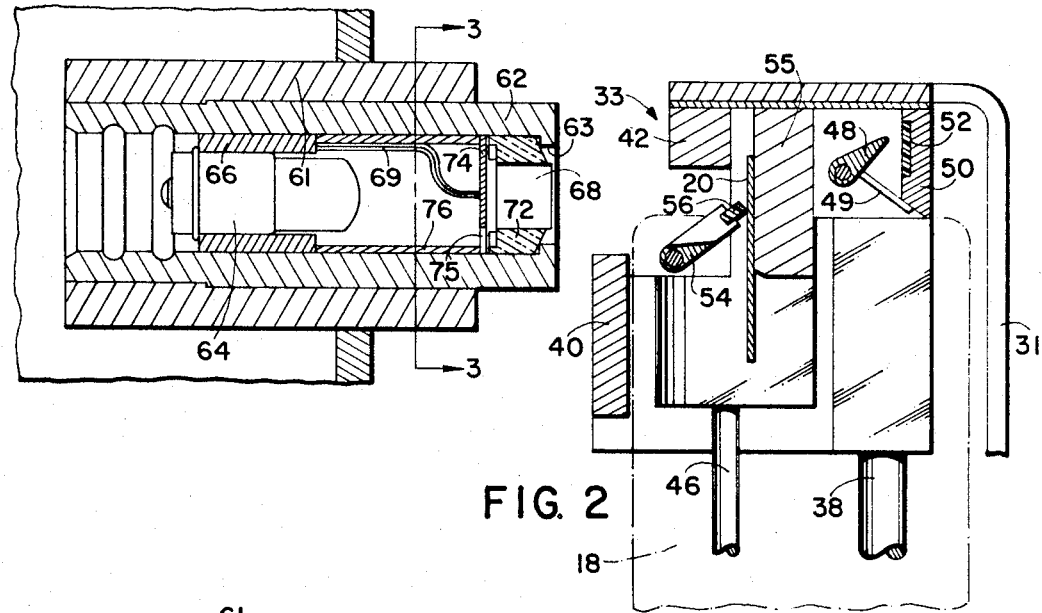
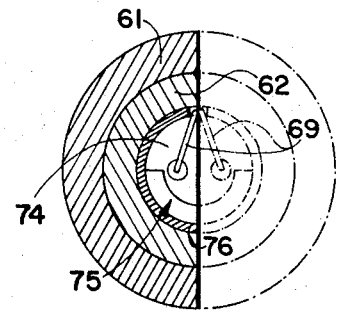
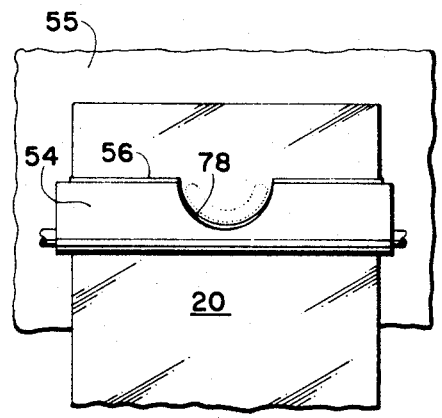
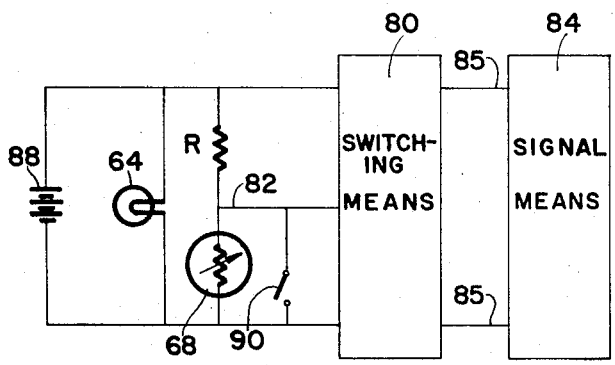

3,418,905
PHOTORESPONSIVE FILM SUPPLY MONITORING
APPARATUS FOR A PHOTOGRAPHIC CAMERA
Milton S. Dietz, Lexington, Mass., assignor to Polaroid
Corporation, Cambridge, Mass., a corporation of
Delaware
Filed Dec. 30, 1965, Ser. No. 517,591
3 Claims. (Cl. 95—11)

ABSTRACT OF THE DISCLOSURE

A film supply monitoring apparatus for a photographic camera incorporating a light source for illuminating a predetermined surface of a photographic film assembly and a photoresponsive device coaxial with the light source and located between the light source and the predetermined surface for controlling the operation of a signal for indicating the readiness of the photographic film assembly for exposure.

---

In cameras capable of continuous operation, such as identification cameras, wherein substantial quantities of film may be exposed in a relatively rapid and uninterrupted manner, preferably some means should be provided for keeping track of the film supply and for indicating to the operator when the film supply is exhausted in order that it may be replenished.

Further, it is desirable for such means to convey additional information to the operator such as certain malfunctions in the film supply apparatus or other conditions of unreadiness of the film for exposure. The need is particularly acute in cameras adapted to accommodate film assemblages having capability for only a limited number of exposures in each assemblage.

In the past, film supply monitoring arrangements have generally included a limit switch as an essential element thereof. Such switches include a probe extending into engagement with the film in order to detect the presence thereof. The probe operates contacts in a circuit including means for signaling to the operator whether or not film is available for exposure.

Such arrangements have certain disadvantages such as the inherent possibility of damage to the film which might be caused by the contact of the probe with the film. Another disadvantage of such arrangements is their sensitivity to variations in the spatial location of the film with respect to the switch. Such arrangements are only capable of conveying information as to the presence or absence of a detectable body. No monitoring of malfunctions or other conditions of unreadiness of the film for exposure is achieved therewith. Also, limit switches of the type described above require a fairly stable and rigid surface for the probe to operate upon and are apt to be unsatisfactory when operating upon a surface having considerable "give."

Such apparatus for monitoring the film supply for a camera should not interfere with the loading of the film in the camera and should be dependable and durable.

Accordingly, it is an object of this invention to provide a photographic camera with apparatus for monitoring the supply of film therefor which is capable of detecting and indicating that the photosensitive film materials are positioned and ready for exposure.

It is another object of this invention to provide in a camera adapted to accommodate pack film including a leader strip, apparatus for monitoring the supply of film therefore including photoresponsive means sensitive to the spectral characteristics of an exposed surface of the leader strip for sensing the presence of a strip projecting from a loaded film pack.

It is yet another object of this invention to provide highly compact and efficient photoresponsive detecting apparatus for detecting a predetermined spectral characteristic of a surface under inspection.

It is still another object of this invention to provide for use with a photographic camera apparatus for monitoring the supply of film therefor which has an instantaneous response and which is extremely durable and reliable.

It is a further object of this invention to provide in a camera apparatus for monitoring the supply of film therefor including a photoresponsive sensing device which is efficient, compact and relatively insensitive to normal ambient light conditions.

This invention is capable of many and diverse applications. The invention has found suitable application with a camera adapted to accommodate pack film of the type including a leader strip projecting from the film pack to facilitate withdrawal of a film unit from the film pack, which strip has a highly light-reflective surface.

Very briefly, apparatus implementing the inventive concept may include a photoresponsive detecting device mounted on a camera so as to address a predetermined location. The device may include a housing containing a photoresponsive element oriented to face the predetermined location and a light source within the housing behind the element for projecting a beam of light toward that location. A prism concentrically disposed around the element serves to concentrate light radiated from the light source into a narrow arcuate beam. The device may comprise part of a larger indicating system which may also include signal means responsive to an electrical parameter of the photoresponsive element in the detecting device. More specifically, the signal means is energized when the element resistance is low and unenergized when the element resistance is high.

When the photosensitive film materials are positioned and ready for exposure, a particular area of the said strip surface is exposed to the detecting device at the predetermined location. The beam of light emitted by the device is concentrated upon the highly reflective surface and collected by the photoresponsive element. When the strip surface is not exposed to the device at the predetermined location, much less light is collected by the element. Hence, the resistance of the element is low when the strip is exposed at the predetermined location and high when it is not. Thus, the system is effective to detect and indicate the presence of a leader strip, and hence film supply exhaustion. In addition, the system is capable of indicating a failure to remove the "dark slide" from the film pack after loading because of its location between the device and the leader strip, and is also capable of detecting certain conditions of incorrect loading, such as when the leader strip has not been caused to project properly from the film pack.

Other objects of this invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 2 is a section view of a detecting device comprising part of the subject invention and film withdrawing apparatus for the camera;

FIG. 3 is a section view on lines 3—3 in FIG. 2;

FIG. 4 is an enlarged fragmentary view of a portion of the film withdrawing apparatus illustrated in FIG. 2 shown engaging a leader strip, as viewed along the axis of the detecting device; and FIG. 5 schematically illustrates circuitry which may be used to implement the inventive concept.

Figure 1:
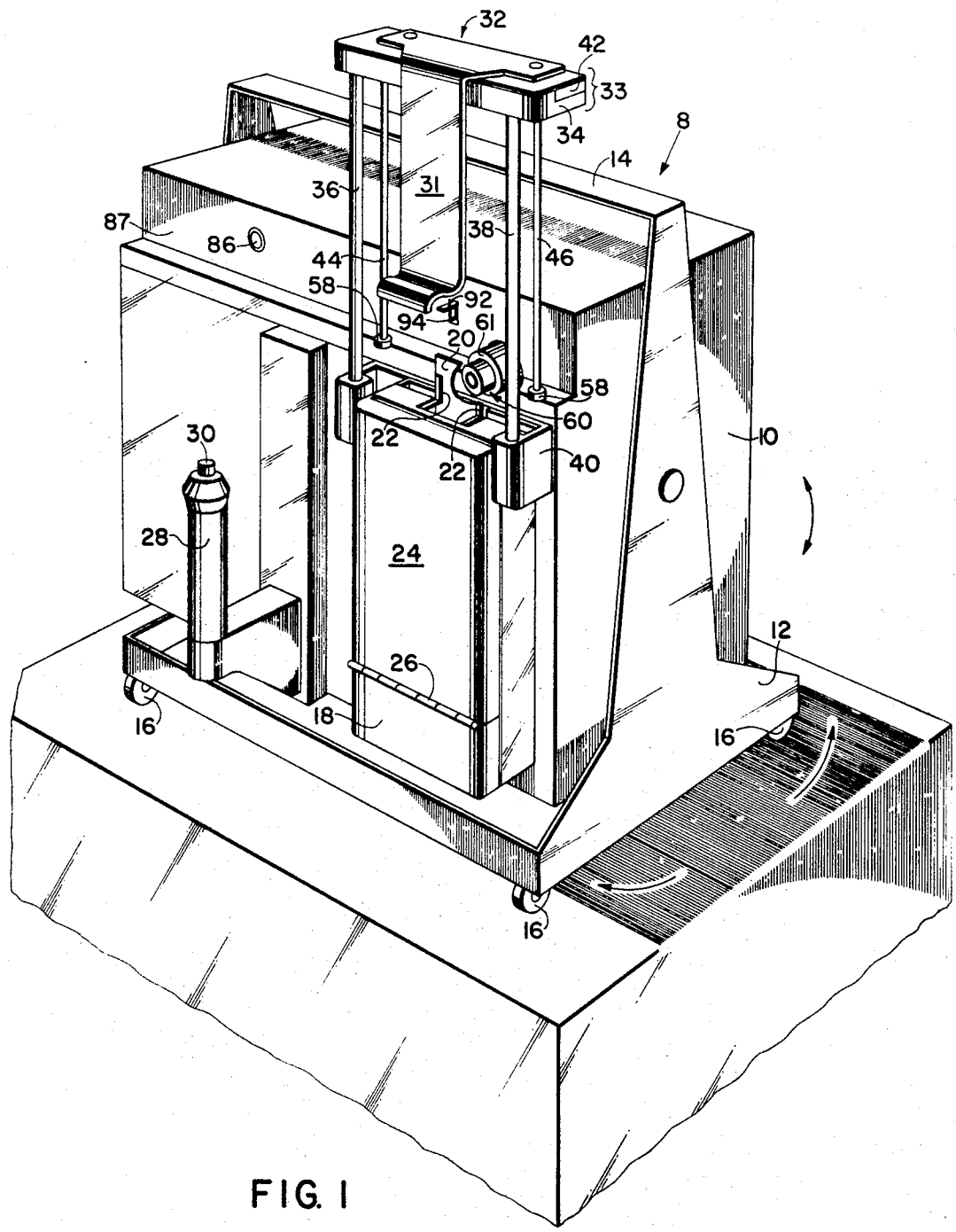
FIG. 1 is a perspective view of a camera embodying the present invention.

The subject invention has found suitable application in an identification camera of the type used by police departments, schools, defense installations, and other organizations for producing on-the-spot identification photographs. Such a camera is illustrated in FIGURE 1.

The camera 8 comprises a camera body 10 pivotally mounted on a base 12 for elevational adjustments. The base 12 has a carrying handle 14 and is provided with wheels 16 for facilitating azimuth adjustments when aiming the camera 8.

The camera 8 has a camera back 18 adapted to accommodate a film pack (not shown). A film pack of the type which may be used is illustrated and described in Patent Nos. 3,079,849 and 3,161,516, both assigned to the assignee of the present invention. Such a film pack encloses an assemblage of film units, each of which units comprises a photosensitive sheet, a print-receiving sheet, and a breakable pod containing processing fluid. To each film unit is attached a leader strip which projects from the film pack and camera back into access of the user of the camera. After the photosensitive sheet is exposed, the leader strip attached to that unit is withdrawn from the film pack and severed from the film unit. This operation superposes the photosensitive sheet upon the print-receiving sheet, and, in addition, causes the leading end of the film unit to project from the film pack into access of the operator. The leading end is then grasped, either manually or mechanically, and the film unit is withdrawn from the film pack. During this withdrawal of the film unit, pressure-applying members within the camera back act upon opposed sides of the film unit, breaking the pod and causing the processing fluid to be distributed between the photosenesitive and print-receiving sheets.

In FIGURE 1 a leader strip 20 is illustrated as projecting from the film pack and the camera back 18. The leader strip 20 has a surface with a spectral characteristic of high light reflectivity. In order to hold the projecting portion of the leader strip 20 in an upright position to facilitate withdrawal thereof, two pairs of resilient fingers 22 are provided grasping marginal edges along opposed sides of the strip 20. The camera back 18 has a door 24 mounted to swing on a hinge 26 for facilitating loading of a film pack. A handle 28 is provided for the purpose of aiming the camera 8. A shutter actuator button 30 is mounted on the top of the handle 28 in a position which makes it conveniently operable by the thumb of the operator.

During the operation of a camera such as the illustrated identification camera utilizing film developed on-the-spot, the film unit is drawn from the camera back immediately after exposure and developed outside of the camera back 18. In order to expedite the withdrawal of the film units from the film pack, film withdrawing apparatus such as is shown in FIGURE 1 at 32 may be provided.

Such film withdrawing apparatus 32 and its operation will be described briefly hereinafter. In FIGURE 1 the film withdrawing apparatus 32 is illustrated supported in its rest position above the camera back; the apparatus is shown in part in its operative position adjacent the camera back 18 in the section view in FIG. 2. The apparatus 32 includes a two-carriage assembly 33 manually movable by means of a handle 31. The assembly 33 includes a primary carriage 34 mounted to reciprocate to and from the camera back 18 on parallel guide rods 36, 38 received in cylindrical apertures in a mounting brace 40.

The assembly 33 also includes a secondary carriage 42 slidably mounted on the primary carriage 34 by means of a second pair of parallel guide rods 44, 46 received in cylindrical apertures (not shown) on the primary carriage 34.

The primary carriage 34 carries a clamping bar 48 for frictionally gripping a leading end of a film unit. The bar 48 is biased by a torsion spring 49 into engagement with a portion 50 of the carriage 34. A rubber insert 52 against which the clamping bar 48 operates improves the frictional grip of the bar 48 on the film unit.

The secondary carriage 42 includes a clamping plate 54 which is tripped to engage the projecting end of a leader strip 20 against an anvil portion 55 of the carriage 42 when the film pulling apparatus 32 is lowered into adjacency with the camera back 18. The clamping plate 54 has a rubber insert 56 on the tip thereof which improves the grip of the clamping plate 54 on the leader strip 20.

The operation of the film withdrawing apparatus 32, briefly, is as follows. As the carriage assembly 33 is moved into contiguity with the camera back 18, the clamping plate 54 on the secondary carriage 42 is tripped into retentive engagement with the end of a leader strip 20 projecting from the film pack through a slot in the camera back 18. As the withdrawal stroke of the apparatus 32 is initiated, by means of the handle 31, only the secondary carriage 42 moves at first, causing the leader strip 20 to be withdrawn from the film pack and severed from the film unit.

At the limit of the stroke of the secondary carriage 42 with respect to the primary carriage 34, the primary carriage 34 is engaged by flange means 58 on the end of guide rods 44, 46 and is "picked up" thereby. The clamping bar 48 on the primary carriage 34 retentively engages the leading end of the film unit which has been caused to be projected from the camera back 18 by the withdrawal of the leader strip 20. As the stroke is continued, the primary carriage 34 is displaced sufficiently away from the camera back 18 to completely withdraw the film unit from the film pack and the camera back 18.

This invention concerns apparatus for monitoring the supply of film for the camera and for detecting certain malfunctions and conditions of unreadiness of the film for exposure. The illustrated embodiment of the invention includes a detecting device 60 mounted upon the camera 8 in a tubular casing 61. The device 60 is directed towards and disposed in close proximity to a predetermined spatial location, namely the location of a projecting end of a leader strip 20 of a film unit which is properly positioned in the camera and ready for exposure.

Referring especially to FIG. 2 and the section view in FIG. 3, the detecting device 60 includes a cylindrical housing 62 having an open end 63. A lamp 64 is supported within the housing 62 on the axis thereof by a concentric sleeve 66. A photoresponsive element 68 having leads 69 is secured in the forward open end 63 of the housing 62 facing outwardly thereof so as to intercept light traveling toward the housing 62 generally along the axis thereof.

An annular prism 72 provides a highly compact and efficient means for converging and concentrating light rays radiated axially by the lamp 64. The prism 72 concentrically surrounds the photoresponsive element 68, serving to mount the element 68 securely in the open end 63 of the housing 62. A shield 74 is disposed between the lamp 64 and the prism 72 in order to occlude a portion of the light which would otherwise be transmitted by the prism 72. The shield has a recess on its periphery which defines an opening 75. The purpose of the shield 74 is to reduce the size of the beam of light projected from the detecting device 60 in order to minimize the size of the inspection surface area required.

A liner 76 serves to space the lamp 64 from the prism 72. The liner 76 has an inner surface which is black anodized in order to absorb any off-axis light rays. Thus, all light rays transmitted to the prism 72 through the opening 75 is parallel to the axis of the housing 62, resulting in a well-defined arcuate detection beam being shaped by the prism 72.

Referring to FIG. 2 and to FIG. 4, it will be seen that the clamping plate 54 has an arcuate depression 78 therein provided for the purpose of passing the detection beam to the leader strip 20 when it is held in the predetermined location by the clamping plate 54. The arcuate detection beam, as shown in FIG. 4, illuminates an area within the compass of the depression 78 in the clamping plate 54.

It is evident from an inspection of FIGS. 2 and 4 that an arcuate detection beam will be radiated from the detecting device 60 to the predetermined location. The beam is partially reflected into the photoresponsive element 68 from any reflective body occupying the predetermined location. The fractional part of the beam which is collected by the element 68 depends mainly upon the spectral characteristics of the surface under inspection at the predetermined location and the acceptance angle of the photoresponsive element 68. The acceptance angle of the element 68 is designed such that substantially all of the light from the detection beam is collected without more than minimal ambient light being collected from the surroundings.

The angle of refraction of the prism 72 is important to the efficiency of the photoresponsive element 68. It has been found that an angle of refraction of approximately 23° from the normal to the surface of the leader strip 20 yields an optimum maximum to minimum resistance ratio of the photoresponsive element 68.

The detecting device 60 comprises part of a larger indicating system, the essential elements of which are shown schematically in FIG. 5. The indicating system includes a switching means 80 which may take many forms, for example, a transistorized trigger circuit triggered by a predetermined control voltage developed on an input terminal 82. A voltage-divider includes a resistance R and the photoresponsive element 68, across which element 68 is developed the control voltage which triggers the switching means 80.

A signal means 84 across the output terminals 85 of the switching means 80 may, for example, take the form of a buzzer and/or a lamp illuminating indicia 86 on a control panel 87 for the camera. The signal generated by the signal means 84 serves to indicate a condition of unreadiness of the film for exposure.

The switching means 80 may be constructed and arranged to control a "pointer light." A "pointer light" is a beam of light projected from a camera upon the subject for the purpose of finding the field of view for the camera. The "pointer light" would preferably be connected in the circuit so as to be deactivated when the buzzer and/or lamp means is activated. Thus the absence of the "pointer light" would immediately indicate to the operator that a condition exists which must be remedied before the next exposure. Other satisfactory signalling arrangements may be devised and are within the contemplation of this invention.

A source of electrical power 88 is connected across the switching means 80 and the voltage divider and also powers the lamp 64 in the detecting device 60. A reset switch 90 shunts the photoresponsive element 68 when closed and thereby renders the element 68 ineffective to control the switching means 80. The reset switch 90 has an actuator 92 extending through an opening 94 in the control panel 87 into the locus of travel of the carriage assembly 33 of the film withdrawing apparatus 32. The reset switch 90 is tripped closed by the carriage assembly 33 when the assembly 33 is moved through a withdrawal stroke away from the camera back 18; the reset switch 90 is opened by the assembly 33 when the assembly 33 is brought into contiguity with the camera back 18 to prepare for another sequence of operation. Thus the resistance of the photoresponsive element 68 is effective to control the switching means 80 only when the carriage assembly is positioned contiguous with the camera back 18.

The above-described film pack with which the invention finds suitable application includes a "dark slide" over the first photosensitive sheet in order to prevent exposure thereof before the pack is loaded in the camera back 18. This "dark slide" has a tab which projects from the film pack when loaded in the camera back 18 through a slot in the camera back 18 into a position between the detecting device 60 and the projecting portion of the leader strip 20 coupled to the first film unit.

It is desirable that the operator of the camera be signaled at the occurrence of any of the following conditions of unreadiness of the film for exposure: (1) that the "dark slide" has not been removed from the film pack after loading thereof; (2) that for some reason such as improper loading of a film pack or faulty operation of the film withdrawing apparatus the portion of the leader strip 20 which is supposed to project from the film pack and camera back 18 between the resilient fingers 22 has not so projected; and (3) that the last film unit in the film pack has been exposed and withdrawn from the camera back or that no film has been loaded in the camera.

It should be noted that in each of the above conditions, the leader strip 20 is not exposed to the detecting device 60 at the particular location to which the device 60 is addressed. This fact is important to the understanding of how the invention monitors each of these conditions.

The circuit components are selected such that a trigger voltage of a predeterminel magnitude will be effective to turn the switching means 90 on to activate the signal means 84.

When the detecting device 60 is exposed to a surface, for example, a highly reflective white surface of a leader strip, the amount of light reflected therefrom and collected by the photoresponsive element 68 will be high. Thus the resistance of the element 68 and the voltage developed across the element 68 will be relatively low. At this condition the switching means 80 will not be turned on and the signal means 84 will remain unenergized. If the system included a "pointer light," the "pointer light" would remain activated to indicate to the operator a condition of readiness for the next exposure. However, if any of the above-described conditions of unreadiness exist wherein the highly reflective surface of the leader strip 20 is not exposed to the device 60 at the predetermined location to which the device 60 is addressed, then the amount of light collected by the photoresponsive element 68 will be relatively low. At this condition, the resistance of the element 68 will be relatively high and the trigger voltage generated thereacross will exceed the predetermined magnitude. The switching means 80 will thus be turned on. The signal means 84, being controlled by the switching means 80, will be activated to signal to the operator that he must remedy the malfunction or replenish the film supply or otherwise correct the condition of unreadiness before the next sequence of operation.

As described above, the reset switch 90 is closed by the carriage assembly 33 of the film withdrawing apparatus when the assembly 33 is moved away from the camera back 18. The reset switch 90 shunts the photo-responsive element 68. Thus, the switching means 80 is operative only when a condition of unreadiness of the film for exposure can accurately be detected. That is, when the carriage assembly 33 is contiguous with the camera back 18.

The above-described monitoring apparatus is particularly suited for use with or incorporation in a photographic camera, finding particular suitability for use in cameras such as the illustrated identification camera. In other photographic applications, the monitoring apparatus might be adapted to indicate with a roll film format the readiness of the photosensitive materials for exposure.

Since certain changes may be made in the above apparatus without departing from the scope of the invention herein involved, it is intended that all matter contained in the above description or shown in the accompanying drawings will be interpreted as illustrative and not in a limiting sense.

What is claimed is:

1. A photographic camera comprising:

means for positioning within said camera a photosensitive material having coupled thereto sheet means with a surface of predetermined spectral characteristics, said sheet means being presented at a predetermined location when said photosensitive material is ready for exposure;

a light source oriented to illuminate the surface of said sheet means at said predetermined location;

a photoresponsive element facing said predetermined location and sensitive to light reflected from a surface of said predetermined spectral characteristics, wherein said photoresponsive element is coaxial with said light source and disposed forwardly thereof and wherein a light transmissive window partly surrounds said element for directing an arcuate beam of light around said element from said source and onto said surface of said sheet means;

means for directing the rays of said arcuate beam of light onto the surface of the sheet means at an angle effective to optimize the amount of light collectable by said photoresponsive element; and means responsive to an electrical parameter of said element for signalling the readiness of said photosensitive material for exposure.

2. The apparatus defined by claim 1 wherein said means for directing the rays of said arcuate beam comprises an annular refractive prism concentrically disposed around said photoresponsive element.

3. A photographic camera comprising:

means to accommodate a film pack receiving a plurality of film units each having a negative photosensitive material and, attached thereto, a sheet having a particular surface area of selected spectral characteristics, the particular surface area being presented at a predetermined location when the negative photosensitive material is positioned in the camera and ready for exposure, and apparatus for monitoring the supply of film units in the camera, including:

a housing having an end opening at the predetermined location, a lamp in said housing for illuminating the surface of the leader strip at the predetermined location, a photoresponsive element in said open end of said housing facing the predetermined location, said photoresponsive element being sensitive to the spectral characteristics of the particular surface area of said attached sheet, signal means for indicating that the particular surface area is exposed at the predetermined location and that the photosensitive materials are positioned and ready for exposure, and switching means responsive to an electrical parameter of said photoresponsive element for controlling said signal means.

References Cited

UNITED STATES PATENTS

| | | | |
|---|---|---|---|
| 2,964,640 | 12/1960 | Wippler | 250—218 |
| 3,288,046 | 11/1966 | Mey | 88—24 |
| 3,316,824 | 5/1967 | Bing et al. | 95—1 |

NORTON ANSHER, *Primary Examiner.*

FRED L. BRAUN, *Assistant Examiner.*

U.S. Cl. X.R.

88—24; 250—219